(12) United States Patent
Kook et al.

(10) Patent No.: US 9,845,846 B2
(45) Date of Patent: Dec. 19, 2017

(54) PLANETARY GEAR TRAIN OF AUTOMATIC TRANSMISSION FOR VEHICLE

(71) Applicant: Hyundai Motor Company, Seoul (KR)

(72) Inventors: Jae Chang Kook, Hwaseong-si (KR); Hyun Sik Kwon, Seoul (KR); Wonmin Cho, Hwaseong-si (KR); Seong Wook Hwang, Gunpo-si (KR); Seongwook Ji, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/334,579

(22) Filed: Oct. 26, 2016

(65) Prior Publication Data

US 2017/0159773 A1  Jun. 8, 2017

(30) Foreign Application Priority Data

Dec. 2, 2015 (KR) .......................... 10-2015-0171011

(51) Int. Cl.
*F16H 3/66* (2006.01)

(52) U.S. Cl.
CPC ....... *F16H 3/66* (2013.01); *F16H 2200/0065* (2013.01); *F16H 2200/2012* (2013.01); *F16H 2200/2046* (2013.01); *F16H 2200/2097* (2013.01)

(58) Field of Classification Search
CPC combination set(s) only.
See application file for complete search history.

(56) References Cited

U.S. PATENT DOCUMENTS

| 8,663,056 B2* | 3/2014 | Gumpoltsberger ....... F16H 3/66 475/276 |
| 9,518,638 B2* | 12/2016 | Muller ...................... F16H 3/66 |
| 9,546,714 B2* | 1/2017 | Kook ......................... F16H 3/66 |
| 2015/0087472 A1 | 3/2015 | Beck et al. |

FOREIGN PATENT DOCUMENTS

| JP | 4950989 B2 | 6/2012 |
| JP | 5734903 B2 | 4/2015 |
| KR | 10-2008-0033789 A | 4/2008 |

* cited by examiner

*Primary Examiner* — Derek D Knight
(74) *Attorney, Agent, or Firm* — Morgan, Lewis & Bockius LLP

(57) ABSTRACT

A planetary gear train of an automatic transmission for a vehicle may include an input shaft for receiving an engine torque, an output shaft for outputting a shifted torque, a first planetary gear set, a second planetary gear set, a third planetary gear set, a fourth planetary gear set, six control elements, a first shaft directly connected with the input shaft, a second shaft selectively connectable with a transmission housing, a third shaft, a fourth shaft, a fifth shaft directly connected with the transmission housing, a sixth shaft selectively connectable with the second shaft, and directly connected with the output shaft, a seventh shaft selectively connectable with the fourth shaft, an eighth shaft selectively connectable with the third shaft and the fourth shaft, and a ninth shaft selectively connectable with the seventh shaft.

10 Claims, 2 Drawing Sheets

FIG. 2

| Shift-stage | C1 | C2 | C3 | C4 | C5 | B1 | Gear ratio |
|---|---|---|---|---|---|---|---|
| D1 | ● | ● | ● | | | | 4.652 |
| D2 | ● | ● | | ● | | | 3.000 |
| D3 | | ● | ● | ● | | | 2.050 |
| D4 | ● | | | ● | ● | | 1.440 |
| D5 | ● | ● | | | ● | | 1.000 |
| D6 | | ● | ● | | ● | | 0.802 |
| D7 | | ● | | ● | ● | | 0.672 |
| D8 | | ● | | | ● | ● | 0.577 |
| D9 | | | | ● | ● | ● | 0.450 |
| REV | | ● | ● | | | ● | -3.565 |

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2015-0171011, filed Dec. 2, 2015, the entire contents of which is incorporated herein for all purposes by this reference.

BACKGROUND OF THE INVENTION

Field of the Invention

The present invention relates to an automatic transmission for a vehicle.

Description of Related Art

Recent increases in oil prices are triggering stiff competition in enhancing fuel consumption of a vehicle.

In this sense, research for an engine has been made to achieve weight reduction and to enhance fuel consumption by so-called downsizing and research on an automatic transmission has been performed to simultaneously provide better drivability and fuel consumption by achieving more shift stages.

However, in order to achieve more shift stages for an automatic transmission, the number of parts is typically increased, which may deteriorate installability and/or power flow efficiency and may increase production cost, and weight.

Therefore, in order to maximally enhance fuel consumption of an automatic transmission having more shift-stages, it is important that better efficiency is derived by less number of parts.

In this respect, an eight-speed automatic transmission has been introduced recently and a planetary gear train for an automatic transmission enabling more shift-stages is under investigation.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle having advantages of, by minimal complexity, realizing at least nine forward speeds and at least one reverse speed, thereby improving power delivery performance improve and fuel consumption due to multi-stages, and improving driving stability of a vehicle by utilizing low rotation speed of an engine.

According to various aspects of the present invention, a planetary gear train of an automatic transmission for a vehicle may include an input shaft for receiving an engine torque, an output shaft for outputting a shifted torque, a first planetary gear set including first, second, and third rotation elements, a second planetary gear set including fourth, fifth, and sixth rotation elements, a third planetary gear set including seventh, eighth, and ninth rotation elements, a fourth planetary gear set including tenth, eleventh, and twelfth rotation elements, six control elements for selectively connecting the rotation elements to each other and to a transmission housing, a first shaft connected with the first rotation element and the seventh rotation element and directly connected with the input shaft, a second shaft connected with the second rotation element and selectively connectable with the transmission housing, a third shaft connected with the third rotation element and the fifth rotation element, a fourth shaft connected with the fourth rotation element, a fifth shaft connected with the sixth rotation element and directly connected with the transmission housing, a sixth shaft connected with the eighth rotation element and the eleventh rotation element, selectively connectable with the second shaft, and directly connected with the output shaft, a seventh shaft connected with the ninth rotation element and selectively connectable with the fourth shaft, an eighth shaft connected with the tenth rotation element and selectively connectable with the third shaft and the fourth shaft, and a ninth shaft connected with the twelfth rotation element and selectively connectable with the seventh shaft.

The first planetary gear set may be a single pinion planetary gear set, where the first rotation element may be a first sun gear, the second rotation element may be a first planet carrier, and the third rotation element may be a first ring gear, the second planetary gear set may be a single pinion planetary gear set, where the fourth rotation element may be a second sun gear, the fifth rotation element may be a second planet carrier, and the sixth rotation element may be a second ring gear, the third planetary gear set may be a single pinion planetary gear set, where the seventh rotation element may be a third sun gear, the eighth rotation element may be a third planet carrier, and the ninth rotation element may be a third ring gear, and the fourth planetary gear set may be a single pinion planetary gear set, where the tenth rotation element may be a fourth sun gear, the eleventh rotation element may be a fourth planet carrier, and the twelfth rotation element may be a fourth ring gear.

The six control elements may be a first clutch selectively connecting the second shaft and the sixth shaft, a second clutch selectively connecting the third shaft and the eighth shaft, a third clutch selectively connecting the fourth shaft and the seventh shaft, a fourth clutch selectively connecting the fourth shaft and the eighth shaft, a fifth clutch selectively connecting the seventh shaft and the ninth shaft, and a first brake selectively connecting the second shaft and the transmission housing.

Shift-stages realized by selective operation of the three control elements among the six control elements may include a forward first speed achieved by operation of the first, second, and third clutches, a forward second speed achieved by operation of the first, second, and fourth clutches, a forward third speed achieved by operation of the second, third, and fourth clutches, a forward fourth speed achieved by operation of the first, fourth, and fifth clutches, a forward fifth speed achieved by operation of the first, second, and fifth clutches, a forward sixth speed achieved by operation of the second, third, and fifth clutches, a forward seventh speed achieved by operation of the second, fourth, and fifth clutches, a forward eighth speed achieved by operation of the second and fifth clutches and the first brake, a forward ninth speed achieved by operation of the fourth and fifth clutches and the first brake, and a reverse speed achieved by operation of the second and third clutches and the first brake.

According to various aspects of the present invention, a planetary gear train of an automatic transmission for a vehicle may include an input shaft for receiving an engine torque, an output shaft for outputting a shifted torque, a first planetary gear set being a single pinion planetary gear set including first, second, and third rotation elements, a second planetary gear set being a single pinion planetary gear set including fourth, fifth, and sixth rotation elements, a third planetary gear set being a single pinion planetary gear set including seventh, eighth, and ninth rotation elements, a fourth planetary gear set being a single pinion planetary gear set including tenth, eleventh, and twelfth rotation elements, a first shaft connected with the first rotation element and the seventh rotation element and directly connected with the input shaft, a second shaft connected with the second rotation element and selectively connectable with a transmission housing, a third shaft connected with the third rotation element and the fifth rotation element, a fourth shaft connected with the fourth rotation element, a fifth shaft connected with the sixth rotation element and directly connected with the transmission housing, a sixth shaft connected with the eighth rotation element and the eleventh rotation element, selectively connectable with the second shaft, and directly connected with the output shaft, a seventh shaft connected with the ninth rotation element and selectively connectable with the fourth shaft, an eighth shaft connected with the tenth rotation element and selectively connectable with the third shaft and the fourth shaft, a ninth shaft connected with the twelfth rotation element and selectively connectable with the seventh shaft, a first clutch selectively connecting the second shaft and the sixth shaft, a second clutch selectively connecting the third shaft and the eighth shaft, a third clutch selectively connecting the fourth shaft and the seventh shaft, a fourth clutch selectively connecting the fourth shaft and the eighth shaft, a fifth clutch selectively connecting the seventh shaft and the ninth shaft, and a first brake selectively connecting the second shaft and the transmission housing.

The first planetary gear set may include a first sun gear as the first rotation element, a first planet carrier as the second rotation element, and a first ring gear as the third rotation element, the second planetary gear set may include a second sun gear as the fourth rotation element, a second planet carrier as the fifth rotation element, and a second ring gear as the sixth rotation element, the third planetary gear set may include a third sun gear as the seventh rotation element, a third planet carrier as the eighth rotation element, and a third ring gear as the ninth rotation element, and the fourth planetary gear set may include a fourth sun gear as the tenth rotation element, a fourth planet carrier as the eleventh rotation element, and a fourth ring gear as the twelfth rotation element.

According to various aspects of the present invention, a planetary gear train of an automatic transmission for a vehicle may include an input shaft for receiving an engine torque, an output shaft for outputting a shifted torque, a first planetary gear set being a single pinion planetary gear set including a first sun gear, a first planet carrier, and a first ring gear, a second planetary gear set being a single pinion planetary gear set including a second sun gear, a second planet carrier, and a second ring gear, a third planetary gear set being a single pinion planetary gear set including a third sun gear, a third planet carrier, and a third ring gear, a fourth planetary gear set being a single pinion planetary gear set including a fourth sun gear, a fourth planet carrier, and a fourth ring gear, a first shaft connected with the first sun gear and the third sun gear, and directly connected with the input shaft, a second shaft connected with the first planet carrier, and selectively connectable with a transmission housing, a third shaft connected with the first ring gear and the second planet carrier, a fourth shaft connected with the second sun gear, a fifth shaft connected with the second ring gear, and directly connected with the transmission housing, a sixth shaft connected with the third planet carrier and the fourth planet carrier, selectively connectable with the second shaft, and directly connected with the output shaft, a seventh shaft connected with the third ring gear and selectively connectable with the fourth shaft, an eighth shaft connected with the fourth sun gear and selectively connectable with the third shaft and the fourth shaft, a ninth shaft connected with the fourth ring gear and selectively connectable with the seventh shaft, and six control elements for selectively connecting the rotation elements to each other and to a transmission housing.

A planetary gear train according to various embodiments of the present invention realizes at least nine forward speeds and at least one reverse speed by operating the four planetary gear sets by controlling six control elements.

In addition, a planetary gear train according to various embodiments of the present invention substantially improves driving stability by realizing shift-stages appropriate for rotation speed of an engine due to multiple speed-stages of an automatic transmission.

Furthermore, a planetary gear train according to various embodiments of the present invention maximizes engine driving efficiency by multiple speed-stages of an automatic transmission, and improves power delivery performance and fuel consumption.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart for respective control elements at respective shift-stages in the planetary gear train according to various embodiments of the present invention.

Figure 1:
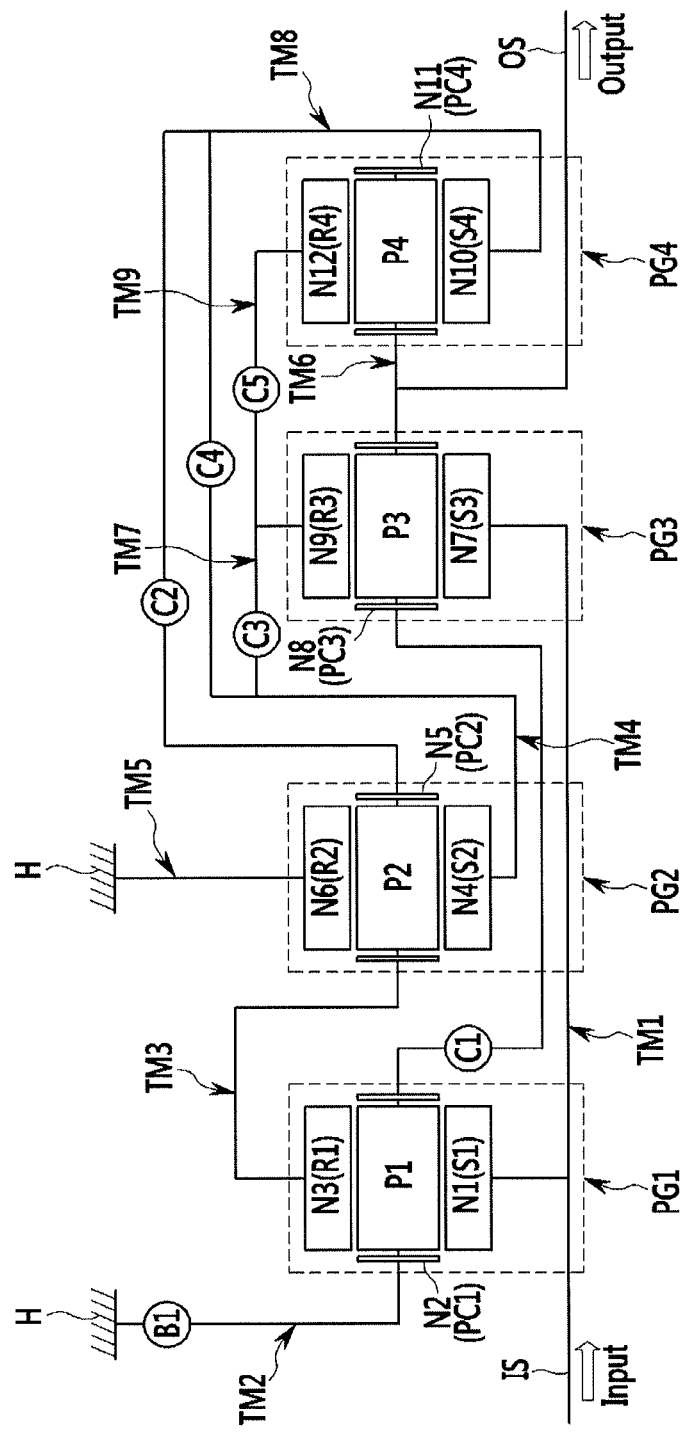
FIG. 1 is a schematic diagram of a planetary gear train according to various embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a schematic diagram of a planetary gear train according to various embodiments of the present invention.

Referring to FIG. 1, a planetary gear train according to various embodiments of the present invention includes first, second, third, and fourth planetary gear sets PG1, PG2, PG3, and PG4 arranged on a same axis, an input shaft IS, an output shaft OS, nine shafts TM1 to TM9 interconnecting rotation elements of the first, second, third, and fourth planetary gear sets PG1, PG2, PG3, and PG4, six control elements C1 to C5 and B1, and a transmission housing H.

Torque input from the input shaft IS is shifted by cooperative operation of the first, second, third, and fourth planetary gear sets PG1, PG2, PG3, and PG4, and then output through the output shaft OS.

The simple planetary gear sets are arranged in the order of first, first, second, third and fourth planetary gear sets PG1, PG2, PG3 and PG4, from an engine side.

The input shaft IS is an input member and the torque from a crankshaft of an engine, after being torque-converted through a torque converter, is input into the input shaft IS.

The output shaft OS is an output member, and being arranged on a same axis with the input shaft IS, delivers a shifted torque to a drive shaft through a differential apparatus.

The first planetary gear set PG1 is a single pinion planetary gear set, and includes a first sun gear S1, a first planet carrier PC1 that supports a first pinion P1 externally engaged with the first sun gear S1, and a first ring gear R1 internally engaged with the first pinion P1. The first sun gear S1 acts as a first rotation element N1, the first planet carrier PC1 acts as a second rotation element N2, and the first ring gear R1 acts as a third rotation element N3.

The second planetary gear set PG2 is a single pinion planetary gear set, and includes a second sun gear S2, a second planet carrier PC2 that supports a second pinion P2 externally engaged with the second sun gear S2, and a second ring gear R2 internally engaged with the second pinion P2. The second sun gear S2 acts as a fourth rotation element N4, the second planet carrier PC2 acts as a fifth rotation element N5, and the second ring gear R2 acts as a sixth rotation element N6.

The third planetary gear set PG3 is a single pinion planetary gear set, and includes a third sun gear S3, a third planet carrier PC3 that supports a third pinion P3 externally engaged with the third sun gear S3, and a third ring gear R3 internally engaged with the third pinion P3. The third sun gear S3 acts as a seventh rotation element N7, the third planet carrier PC3 acts as an eighth rotation element N8, and the third ring gear R3 acts as a ninth rotation element N9.

The fourth planetary gear set PG4 is a single pinion planetary gear set, and includes a fourth sun gear S4, a fourth planet carrier PC4 that supports a fourth pinion P4 externally engaged with the fourth sun gear S4, and a fourth ring gear R4 internally engaged with the fourth pinion P4. The fourth sun gear S4 acts as a tenth rotation element N10, the fourth planet carrier PC4 acts as a eleventh rotation element N11, and the fourth ring gear R4 acts as a twelfth rotation element N12.

In the first, second, third, and fourth planetary gear sets PG1, PG2, PG3, and PG4, the first rotation element N1 is directly connected with the seventh rotation element N7, the third rotation element N3 is directly connected with the fifth rotation element N5, the eighth rotation element N8 is directly connected with eleventh rotation element N11, by nine shafts TM1 to TM9.

The nine shafts TM1 to TM9 are hereinafter described in detail.

The first shaft TM1 is connected with the first rotation element N1 (first sun gear S1) and the seventh rotation element N7 (third sun gear S3), and directly connected with the input shaft IS, thereby continuously acting as an input element.

The second shaft TM2 is connected with the second rotation element N2 (first planet carrier PC1), and selectively connectable with the transmission housing H, thereby selectively acting as a fixed element.

The third shaft TM3 is connected with the third rotation element N3 (first ring gear R1) and the fifth rotation element N5 (second planet carrier PC2).

The fourth shaft TM4 is connected with fourth rotation element N4 (second sun gear S4).

The fifth shaft TM5 is connected with the sixth rotation element N6 (second ring gear R2), and directly connected with the transmission housing H, thereby continuously acting as a fixed element.

The sixth shaft TM6 is connected with the eighth rotation element N8 (third planet carrier PC3) and the eleventh rotation element N11 (fourth planet carrier PC4), selectively connectable with the second shaft TM2, and directly connected with the output shaft OS, thereby continuously acting as an output element.

The seventh shaft TM7 is connected with the ninth rotation element N9 (third ring gear R3), and selectively connectable with the fourth shaft TM4.

The eighth shaft TM8 is connected with the tenth rotation element N10 (fourth sun gear S4), and selectively connectable with the third, fourth shaft TM3 and TM4.

The ninth shaft TM9 is connected with the twelfth rotation element N12 (fourth ring gear R4), and selectively connectable with the seventh shaft TM7.

The shafts TM1 to TM9 may be selectively interconnected with one another by control elements of five clutches C1, C2, C3, C4, and C5.

The shafts TM1 to TM9 may be selectively connectable with the transmission housing H, by a control element of one brakes B1.

The six control elements C1 to C5 and B1 are arranged as follows.

The first clutch C1 is arranged between the second shaft TM2 and the sixth shaft TM6, such that the second shaft TM2 and the sixth shaft TM6 may selectively become integral.

The second clutch C2 is arranged between the third shaft TM3 and the eighth shaft TM8, such that the third shaft TM3 and the eighth shaft TM8 may selectively become integral.

The third clutch C3 is arranged between the fourth shaft TM4 and the seventh shaft TM7, such that the fourth shaft TM4 and the seventh shaft TM7 may selectively become integral.

The fourth clutch C4 is arranged between the fourth shaft TM4 and the eighth shaft TM8, such that the fourth shaft TM4 and the eighth shaft TM8 may selectively become integral.

The fifth clutch C5 is arranged between the seventh shaft TM7 and the ninth shaft TM9, such that the seventh shaft TM7 and the ninth shaft TM9 may selectively become integral.

The first brake B1 is arranged between the second shaft TM2 and the transmission housing H, such that the second shaft TM2 may selectively act as a fixed element.

The control elements of the first, second, third, fourth, and fifth clutches C1, C2, C3, C4, C5 and the first brake B1 may be realized as multi-plate hydraulic pressure friction devices that are frictionally engaged by hydraulic pressure.

FIG. 2 is an operational chart for respective control elements at respective shift-stages in a planetary gear train according to various embodiments of the present invention.

As shown in FIG. 2, a planetary gear train according to various embodiments of the present invention performs shifting by operating three control elements at respective shift-stages.

In the forward first speed D1, the first, second, and third clutches C1, C2, and C3 are operated. As a result, the second shaft TM2 is connected with the sixth shaft TM6 by the operation of the first clutch C1, the third shaft TM3 is connected with the eighth shaft TM8 by the operation of the second clutch C2, and the fourth shaft TM4 is connected with the seventh shaft TM7 by the operation of the third clutch C3. In this state, torque of the input shaft IS is input to the first shaft TM1. In addition, the fifth shaft TM5 acts as a fixed element, thereby realizing the forward first speed and outputting a shifted torque through the output shaft OS connected with the sixth shaft TM6.

In the forward second speed D2, the first, second, and fourth clutches C1, C2, and C4 are operated. As a result, the second shaft TM2 is connected with the sixth shaft TM6 by the operation of the first clutch C1, the third shaft TM3 is connected with the eighth shaft TM8 by the operation of the second clutch C2, and the fourth shaft TM4 is connected with the eighth shaft TM8 by the operation of the fourth clutch C4. In this state, torque of the input shaft IS is input to the first shaft TM1. In addition, the fifth shaft TM5 acts as a fixed element, thereby realizing the forward second speed and outputting a shifted torque through the output shaft OS connected with the sixth shaft TM6.

In the forward third speed D3, the second, third, and fourth clutches C2, C3, and C4 are operated. As a result, the third shaft TM3 is connected with the eighth shaft TM8 by the operation of the second clutch C2, the fourth shaft TM4 is connected with the seventh shaft TM7 by the operation of the third clutch C3, and the fourth shaft TM4 is connected with the eighth shaft TM8 by the operation of the fourth clutch C4. In this state, torque of the input shaft IS is input to the first shaft TM1. In addition, the fifth shaft TM5 acts as a fixed element, thereby realizing the forward third speed and outputting a shifted torque through the output shaft OS connected with the sixth shaft TM6.

In the forward fourth speed D4, the first, fourth, and fifth clutches C1, C4, and C5 are operated. As a result, the second shaft TM2 is connected with the sixth shaft TM6 by the operation of the first clutch C1, the fourth shaft TM4 is connected with the eighth shaft TM8 by the operation of the fourth clutch C4, and the seventh shaft TM7 is connected with the ninth shaft TM9 by the operation of the fifth clutch C5. In this state, torque of the input shaft IS is input to the first shaft TM1. In addition, the fifth shaft TM5 acts as a fixed element, thereby realizing the forward fourth speed and outputting a shifted torque through the output shaft OS connected with the sixth shaft TM6.

In the forward fifth speed D5, the first, second, and fifth clutches C1, C2, and C5 are operated. As a result, the second shaft TM2 is connected with the sixth shaft TM6 by the operation of the first clutch C1, the third shaft TM3 is connected with the eighth shaft TM8 by the operation of the second clutch C2, and the seventh shaft TM7 is connected with the ninth shaft TM9 by the operation of the fifth clutch C5. In this state, torque of the input shaft IS is input to the first shaft TM1. In addition, the fifth shaft TM5 acts as a fixed element, thereby realizing the forward fifth speed and outputting the input torque through the output shaft OS connected with the sixth shaft TM6.

In the forward sixth speed D6, the second, third, and fifth clutches C2, C3, and C5 are operated. As a result, the third shaft TM3 is connected with the eighth shaft TM8 by the operation of the second clutch C2, the fourth shaft TM4 is connected with the seventh shaft TM7 by the operation of the third clutch C3, and the seventh shaft TM7 is connected with the ninth shaft TM9 by the operation of the fifth clutch C5. In this state, torque of the input shaft IS is input to the first shaft TM1. In addition, the fifth shaft TM5 acts as a fixed element, thereby realizing the forward sixth speed and outputting a shifted torque through the output shaft OS connected with the sixth shaft TM6.

In the forward seventh speed D7, the second, fourth, and fifth clutches C2, C4, and C5 are operated. As a result, the third shaft TM3 is connected with the eighth shaft TM8 by the operation of the second clutch C2, the fourth shaft TM4 is connected with the eighth shaft TM8 by the operation of the fourth clutch C4, and the seventh shaft TM7 is connected with the ninth shaft TM9 by the operation of the fifth clutch C5. In this state, torque of the input shaft IS is input to the first shaft TM1. In addition, the fifth shaft TM5 acts as a fixed element, thereby realizing the forward seventh speed and outputting a shifted torque through the output shaft OS connected with the sixth shaft TM6.

In the forward eighth speed D8, the second and fifth clutches C2 and C5 and the first brake B1 are operated. As a result, the third shaft TM3 is connected with the eighth shaft TM8 by the operation of the second clutch C2, and the seventh shaft TM7 is connected with the ninth shaft TM9 by the operation of the fifth clutch C5. In this state, torque of the input shaft IS is input to the first shaft TM1. In addition, while the fifth shaft TM5 is acting as a fixed element, the second shaft TM2 acts as a fixed element by the operation of the first brake B1, thereby realizing the forward eighth speed and outputting a shifted torque through the output shaft OS connected with the sixth shaft TM6.

In the forward ninth speed D9, the fourth and fifth clutches C4 and C5 and the first brake B1 are operated. As a result, the fourth shaft TM4 is connected with the eighth shaft TM8 by the operation of the fourth clutch C4, and the seventh shaft TM7 is connected with the ninth shaft TM9 by the operation of the fifth clutch C5. In this state, torque of the input shaft IS is input to the first shaft TM1. In addition, while the fifth shaft TM5 is acting as a fixed element, the second shaft TM2 acts as a fixed element by the operation of the first brake B1, thereby realizing the forward ninth speed and outputting a shifted torque through the output shaft OS connected with the sixth shaft TM6.

In the reverse speed REV, the second and third clutch C2 and C3 and the first brake B1 are operated. As a result, the third shaft TM3 is connected with the eighth shaft TM8 by the operation of the second clutch C2, and the fourth shaft TM4 is connected with the seventh shaft TM7 by the operation of the third clutch C3. In this state, torque of the input shaft IS is input to the first shaft TM1. In addition, while the fifth shaft TM5 is acting as a fixed element, the second shaft TM2 acts as a fixed element by the operation of the first brake B1, thereby realizing the reverse speed and outputting a shifted torque through the output shaft OS connected with the sixth shaft TM6.

As described above, a planetary gear train according to an exemplary embodiment of the present invention may realize at least nine forward speeds and at least one reverse speed by four planetary gear sets PG1, PG2, PG3, and PG4 by controlling five clutches C1, C2, C3, C4, and C5 and one brake B1.

In addition, a planetary gear train according to various embodiments of the present invention may substantially improve driving stability by realizing shift-stages appropriate for rotation speed of an engine due to multi-stages of an automatic transmission.

In addition, a planetary gear train according to various embodiments of the present invention maximize engine driving efficiency by multi-stages of an automatic transmission, and may improve power delivery performance and fuel consumption.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
    an input shaft for receiving an engine torque;
    an output shaft for outputting a shifted torque;
    a first planetary gear set including a first rotation element, a second rotation element, and a third rotation element;
    a second planetary gear set including a fourth rotation element, a fifth rotation element, and a sixth rotation element;
    a third planetary gear set including a seventh rotation element, an eighth rotation element, and a ninth rotation element;
    a fourth planetary gear set including a tenth rotation element, an eleventh rotation element, and a twelfth rotation element;
    six control elements, each of which selectively connects a corresponding pair among the input shaft, the output shaft, the first to twelfth rotation elements and a transmission housing;
    a first shaft connected with the first rotation element and the seventh rotation element and directly connected with the input shaft;
    a second shaft connected with the second rotation element and selectively connectable with the transmission housing;
    a third shaft connected with the third rotation element and the fifth rotation element;
    a fourth shaft connected with the fourth rotation element;
    a fifth shaft connected with the sixth rotation element and directly connected with the transmission housing;
    a sixth shaft connected with the eighth rotation element and the eleventh rotation element, selectively connectable with the second shaft, and directly connected with the output shaft;
    a seventh shaft connected with the ninth rotation element and selectively connectable with the fourth shaft;
    an eighth shaft connected with the tenth rotation element and selectively connectable with the third shaft and the fourth shaft; and
    a ninth shaft connected with the twelfth rotation element and selectively connectable with the seventh shaft.

2. The planetary gear train of claim 1, wherein
    the first planetary gear set comprises a single pinion planetary gear set, where the first rotation element is a first sun gear, the second rotation element is a first planet carrier, and the third rotation element is a first ring gear;
    the second planetary gear set comprises a single pinion planetary gear set, where the fourth rotation element is a second sun gear, the fifth rotation element is a second planet carrier, and the sixth rotation element is a second ring gear;
    the third planetary gear set comprises a single pinion planetary gear set, where the seventh rotation element is a third sun gear, the eighth rotation element is a third planet carrier, and the ninth rotation element is a third ring gear; and
    the fourth planetary gear set comprises a single pinion planetary gear set, where the tenth rotation element is a fourth sun gear, the eleventh rotation element is a fourth planet carrier, and the twelfth rotation element is a fourth ring gear.

3. The planetary gear train of claim 1, wherein the six control elements comprise:
    a first clutch selectively connecting the second shaft and the sixth shaft;
    a second clutch selectively connecting the third shaft and the eighth shaft;
    a third clutch selectively connecting the fourth shaft and the seventh shaft;
    a fourth clutch selectively connecting the fourth shaft and the eighth shaft;
    a fifth clutch selectively connecting the seventh shaft and the ninth shaft; and
    a first brake selectively connecting the second shaft and the transmission housing.

4. The planetary gear train of claim 3, wherein shift-stages realized by selective operation of the three control elements among the six control elements comprise:
    a first forward speed achieved by operation of the first, second, and third clutches;
    a second forward speed achieved by operation of the first, second, and fourth clutches;
    a third forward speed achieved by operation of the second, third, and fourth clutches;
    a forward fourth speed achieved by operation of the first, fourth, and fifth clutches;
    a fifth forward speed achieved by operation of the first, second, and fifth clutches;
    a sixth forward speed achieved by operation of the second, third, and fifth clutches;
    a seventh forward speed achieved by operation of the second, fourth, and fifth clutches;
    an eighth forward speed achieved by operation of the second and fifth clutches and the first brake;

a ninth forward speed achieved by operation of the fourth and fifth clutches and the first brake; and
a reverse speed achieved by operation of the second and third clutches and the first brake.

5. A planetary gear train of an automatic transmission for a vehicle, comprising:
an input shaft for receiving an engine torque;
an output shaft for outputting a shifted torque;
a first planetary gear set comprising a single pinion planetary gear set including a first rotation element, a second rotation element, and a third rotation element;
a second planetary gear set comprising a single pinion planetary gear set including a fourth rotation element, a fifth rotation element, and a sixth rotation element;
a third planetary gear set comprising a single pinion planetary gear set including a seventh rotation element, an eighth rotation element, and a ninth rotation element;
a fourth planetary gear set comprising a single pinion planetary gear set including a tenth rotation element, an eleventh rotation element, and a twelfth rotation element;
a first shaft connected with the first rotation element and the seventh rotation element and directly connected with the input shaft;
a second shaft connected with the second rotation element and selectively connectable with a transmission housing;
a third shaft connected with the third rotation element and the fifth rotation element;
a fourth shaft connected with the fourth rotation element;
a fifth shaft connected with the sixth rotation element and directly connected with the transmission housing;
a sixth shaft connected with the eighth rotation element and the eleventh rotation element, selectively connectable with the second shaft, and directly connected with the output shaft;
a seventh shaft connected with the ninth rotation element and selectively connectable with the fourth shaft;
an eighth shaft connected with the tenth rotation element and selectively connectable with the third shaft and the fourth shaft;
a ninth shaft connected with the twelfth rotation element and selectively connectable with the seventh shaft;
a first clutch selectively connecting the second shaft and the sixth shaft;
a second clutch selectively connecting the third shaft and the eighth shaft;
a third clutch selectively connecting the fourth shaft and the seventh shaft;
a fourth clutch selectively connecting the fourth shaft and the eighth shaft;
a fifth clutch selectively connecting the seventh shaft and the ninth shaft; and
a first brake selectively connecting the second shaft and the transmission housing.

6. The planetary gear train of claim 5, wherein
the first planetary gear set includes a first sun gear as the first rotation element, a first planet carrier as the second rotation element, and a first ring gear as the third rotation element;
the second planetary gear set includes a second sun gear as the fourth rotation element, a second planet carrier as the fifth rotation element, and a second ring gear as the sixth rotation element;
the third planetary gear set includes a third sun gear as the seventh rotation element, a third planet carrier as the eighth rotation element, and a third ring gear as the ninth rotation element; and
the fourth planetary gear set includes a fourth sun gear as the tenth rotation element, a fourth planet carrier as the eleventh rotation element, and a fourth ring gear as the twelfth rotation element.

7. The planetary gear train of claim 5, wherein shift-stages realized by selective operation of three control elements among the first to fifth clutches and the first brake comprise:
a first forward speed achieved by operation of the first, second, and third clutches;
a second forward speed achieved by operation of the first, second, and fourth clutches;
a third forward speed achieved by operation of the second, third, and fourth clutches;
a fourth forward speed achieved by operation of the first, fourth, and fifth clutches;
a fifth forward speed achieved by operation of the first, second, and fifth clutches;
a sixth forward speed achieved by operation of the second, third, and fifth clutches;
a seventh forward speed achieved by operation of the second, fourth, and fifth clutches;
an eighth forward speed achieved by operation of the second and fifth clutches and the first brake;
a ninth forward speed achieved by operation of the fourth and fifth clutches and the first brake; and
a reverse speed achieved by operation of the second and third clutches and the first brake.

8. A planetary gear train of an automatic transmission for a vehicle, comprising:
an input shaft for receiving an engine torque;
an output shaft for outputting a shifted torque;
a first planetary gear set comprising a single pinion planetary gear set including a first sun gear as a first rotation element, a first planet carrier as a second rotation element, and a first ring gear as a third rotation element;
a second planetary gear set comprising a single pinion planetary gear set including a second sun gear as a fourth rotation element, a second planet carrier as a fifth rotation element, and a second ring gear as a sixth rotation element;
a third planetary gear set comprising a single pinion planetary gear set including a third sun gear as a seventh rotation element, a third planet carrier as an eighth rotation element, and a third ring gear as a ninth rotation element;
a fourth planetary gear set comprising a single pinion planetary gear set including a fourth sun gear as a tenth rotation element, a fourth planet carrier as a eleventh rotation element, and a fourth ring gear as a twelfth rotation element;
a first shaft connected with the first sun gear and the third sun gear, and directly connected with the input shaft;
a second shaft connected with the first planet carrier, and selectively connectable with a transmission housing;
a third shaft connected with the first ring gear and the second planet carrier;
a fourth shaft connected with the second sun gear;
a fifth shaft connected with the second ring gear, and directly connected with the transmission housing;
a sixth shaft connected with the third planet carrier and the fourth planet carrier, selectively connectable with the second shaft, and directly connected with the output shaft;

a seventh shaft connected with the third ring gear and selectively connectable with the fourth shaft;
an eighth shaft connected with the fourth sun gear and selectively connectable with the third shaft and the fourth shaft;
a ninth shaft connected with the fourth ring gear and selectively connectable with the seventh shaft; and
six control elements, each of which selectively connects a corresponding pair among the input shaft, the output shaft, the first to twelfth rotation elements and a transmission housing.

9. The planetary gear train of claim 8, wherein the six control elements comprise:
a first clutch selectively connecting the second shaft and the sixth shaft;
a second clutch selectively connecting the third shaft and the eighth shaft;
a third clutch selectively connecting the fourth shaft and the seventh shaft;
a fourth clutch selectively connecting the fourth shaft and the eighth shaft;
a fifth clutch selectively connecting the seventh shaft and the ninth shaft; and
a first brake selectively connecting the second shaft and the transmission housing.

10. The planetary gear train of claim 9, wherein shift-stages realized by selective operation of the three control elements among the six control elements comprises:
a first forward speed achieved by operation of the first, second, and third clutches;
a second forward speed achieved by operation of the first, second, and fourth clutches;
a third forward speed achieved by operation of the second, third, and fourth clutches;
a fourth forward speed achieved by operation of the first, fourth, and fifth clutches;
a fifth forward speed achieved by operation of the first, second, and fifth clutches;
a sixth forward speed achieved by operation of the second, third, and fifth clutches;
a seventh forward speed achieved by operation of the second, fourth, and fifth clutches;
an eighth forward speed achieved by operation of the second and fifth clutches and the first brake;
a ninth forward speed achieved by operation of the fourth and fifth clutches and the first brake; and
a reverse speed achieved by operation of the second and third clutches and the first brake.

* * * * *